(12) United States Patent
Day et al.

(10) Patent No.: US 7,162,789 B2
(45) Date of Patent: *Jan. 16, 2007

(54) METHOD FOR DRILLING HOLES AND OPTIONALLY INSERTING FASTENERS

(75) Inventors: Arthur Day, Seattle, WA (US); Bruce David Stanley, Long Beach, CA (US)

(73) Assignee: The Boeing Company, Seattle, WA (US)

( * ) Notice: Subject to any disclaimer, the term of this patent is extended or adjusted under 35 U.S.C. 154(b) by 279 days.

This patent is subject to a terminal disclaimer.

(21) Appl. No.: 10/695,601

(22) Filed: Oct. 28, 2003

(65) Prior Publication Data

US 2004/0088843 A1      May 13, 2004

Related U.S. Application Data

(62) Division of application No. 10/158,285, filed on May 30, 2002, now Pat. No. 6,905,291.

(51) Int. Cl.
*B23P 11/00* (2006.01)
*B23B 47/00* (2006.01)

(52) U.S. Cl. ............... 29/525.01; 29/557; 408/1 R; 408/241 B

(58) Field of Classification Search ............ 408/67, 408/76, 97, 115 R, 241 B, 1 R; 29/34 B, 29/557, 525.01
See application file for complete search history.

(56) References Cited

U.S. PATENT DOCUMENTS

| 710,257 | A | * | 9/1902 | DeLeeuw ............ 408/76 |
| 2,818,655 | A | | 1/1958 | De Gaston |
| 2,835,148 | A | | 5/1958 | Buck |
| 2,861,484 | A | | 11/1958 | Rance |
| 3,728,027 | A | | 4/1973 | Watanabe |
| 3,729,809 | A | | 5/1973 | Vawter et al. |
| 3,969,036 | A | | 7/1976 | Hougen |
| 4,765,175 | A | | 8/1988 | Denham et al. |
| 4,790,470 | A | | 12/1988 | Miles |
| 4,967,947 | A | | 11/1990 | Sarh |
| 4,992,009 | A | | 2/1991 | Wallach |
| 5,031,489 | A | | 7/1991 | Young et al. |

(Continued)

FOREIGN PATENT DOCUMENTS

FR      2669654      5/1992

(Continued)

*Primary Examiner*—Essama Omgba
(74) *Attorney, Agent, or Firm*—Alston & Bird LLP

(57) ABSTRACT

The method and apparatus for drilling holes and optionally inserting fasteners of the present invention provide for efficiently drilling holes through a multiple-layer structure because the layers are securely held together during the drilling by an electromagnet and a clamp, each on opposite sides of the structure. The electromagnet and clamp hold the layers together so tightly that burrs do not form within the holes and debris does not accumulate between the layers and, therefore the layers do not have to be disassembled after drilling. In addition, the apparatus and method of the present invention provide for initially drilling the hole with a countersink and for inserting a fastener into the hole, through the electromagnet, immediately after drilling the hole, such that the hole does not have to be revisited after reassembly and drying of the sealant in order to drill a countersink and/or insert a fastener.

14 Claims, 4 Drawing Sheets

U.S. PATENT DOCUMENTS

| | | |
|---|---|---|
| 5,615,483 A | 4/1997 | Micale et al. |
| 5,685,058 A * | 11/1997 | Givler .................... 29/525.06 |
| 6,098,260 A | 8/2000 | Sarh |
| 6,129,031 A | 10/2000 | Sarh et al. |
| 6,264,055 B1 | 7/2001 | Dozier |
| 6,357,101 B1 | 3/2002 | Sarh et al. |

FOREIGN PATENT DOCUMENTS

| | | |
|---|---|---|
| JP | 406270005 A | 9/1994 |

* cited by examiner

METHOD FOR DRILLING HOLES AND OPTIONALLY INSERTING FASTENERS

CROSS-REFERENCE TO RELATED APPLICATIONS

This application is a divisional of U.S. application Ser. No. 10/158,285, filed May 30, 2002 now U.S. Pat. No. 6,905,291, which is hereby incorporated herein in its entirety by reference.

BACKGROUND OF THE INVENTION

The present invention relates to enabling an operator to drill holes and optionally insert fasteners, and, in particular to drilling holes and optionally inserting fasteners through multi-layer structures by utilizing an electromagnet assembly to securely clamp the multi-layer structure together during the operation.

The fasteners that hold together multi-layer structures, particularly those structures that are subject to significant dynamic forces and/or pressure over their lifetime, such as aircraft bodies, bridges, vehicle bodies, buildings, and others, must be properly secured in order to ensure that the structure will perform as intended over its lifetime. In order to properly secure a fastener in a multi-layer structure, the fastener hole must not have any sharp edges, i.e., burrs, there must not be debris between the layers, and any sealant applied between the layers in order to make the structure air and/or water tight must be sufficiently squeezed out. When excess sealant is present between the layers, the distance between the layers is increased and/or uneven, which may be referred to as a "gasket" condition. Thus, if burrs, debris and/or excessive sealant are present, then the layers cannot be properly fastened and the layers may suffer corrosion, cracking and/or premature fatigue failure, which generally renders the structure ineffective for its intended purpose and, therefore, subject to the expense of repair or replacement.

Thus, ensuring that a burr-less hole is drilled, that there is no debris between the layers, and that sealant is properly applied between the layers is an integral part of fastening multi-layer structures together. In the aerospace industry, for example, a significant amount of time and labor is expended ensuring that the holes through the significant amount of time and labor is expended ensuring that the holes through the various layers of the aircraft structure are appropriately drilled, cleaned, sealed and fastened. Initially, the layers of materials that form the structure are loosely assembled without sealant, and drill templates are aligned and attached to the structure in the areas to be drilled. A drill operator, guided by the drill template, then drills holes through the layers of materials typically using a manual drill motor. As the hole is being drilled through the layers, the drill bit tip pushes with the full feed force applied to the drill motor. This can cause a gap to develop between a drilled layer and the next layer, particularly when the layers are a stack up of thin material. The gap between the layers causes burrs about the hole and debris is likely to gather between the layers. Thus, once the holes are drilled, the layers must be disassembled, the burrs must be removed from the holes, and the debris must be cleaned from the surfaces of the layers, all of which is a time-consuming and labor intensive process.

Sealant is then applied to the layers prior to re-assembling the layers. In order to ensure the layers are properly sealed to provide an air and water-tight seal, a generous amount of sealant is applied to the layers. Clamps that extend through the holes, such as KWIK-LOK™ clamps commercially available from Zephyr Manufacturing Company, Inglewood, Calif., must be placed through each hole of the reassembled layers in order to squeeze out the sealant to prevent excessive "gasket" between the layers before the sealant dries. The extra sealant squeezes out around the clamps and must be cleaned from the structure and the clamps during clamping and/or after the clamps are removed.

Once the sealant is cured, the clamps may be removed and the holes may be countersunk. In order to countersink a hole, a countersink drill bit and microstop countersink cage are attached to the drill motor and the operator revisits each hole to drill the countersink. The holes are then inspected to ensure they were properly countersunk. The holes may be inspected by checking the countersink of each hole with a measuring tool, or by installing the fastener to check if it fits properly within the hole and countersink. If the holes are satisfactory, then fasteners may be installed and fastened with nuts or swage lock collars. Overall, this process is expensive, laborious, and time-consuming. In addition, the integrity of the resulting holes depends upon the completion of many manual processes, which creates a risk that certain steps may be performed inadequately or completely overlooked.

Therefore, a need exists to drill holes and install fasteners in multi-layer structures in a more efficient manner, such as by reducing or eliminating the time and expense involved in disassembling the drilled layers, de-burring the holes, cleaning the debris from the layers, reassembling the layers, clamping the holes, waiting for the sealant to dry, and revisiting the holes to drill the countersink. In particular, there is a need to efficiently drill holes and install fasteners in multi-layer structures in one operation, such that the time and money involved in the manufacture of multi-layer structures is significantly reduced.

BRIEF SUMMARY OF THE INVENTION

The apparatus and method for drilling holes and optionally inserting fasteners of the present invention reduce the time and expense involved in the manufacture of a multi-layer structure by eliminating the need to disassemble the drilled layers in order to de-burr the holes and clean the debris from the layers before reassembling and sealing the layers and countersinking the holes. The apparatus and method of this invention provide for drilling holes, such as countersunk holes, in sealed, tightly held layers of a structure and optionally inserting fasteners in the holes such that the process is completed in one efficient operation. The layers of the structure are held together by an electromagnet through which a drilling tool may extend and a clamp at least partially made of magnetic material, such that a hole may be drilled through the layers without creating burrs or allowing debris to accumulate between the layers. A fastener may be then immediately inserted in the hole.

The apparatus and method for drilling a hole in a multiple-layer structure include an electromagnet defining an opening sized to receive a drilling tool and a clamp made of at least partially magnetic material, such as a ferrous metal. The electromagnet is positioned proximate the structure such that the opening of the electromagnet defines the location of the hole to be drilled in the structure. The clamp is positioned proximate the structure, opposite the electromagnet, such that the electromagnet and the clamp are capable of holding the multiple layer structure together when the electromagnet is energized. The clamp may also define an opening and, if so, the opening of the clamp is aligned with the opening of the electromagnet. A drilling tool may then be positioned within the opening of the electromagnet in order to drill a hole through the multiple-layer structure.

Prior to positioning the electromagnet, the multiple layers of the structure may be sealed. While positioning the electromagnet, the electromagnet opening may be normalized to the portion of the structure to be drilled. The electromagnet may be made of a plurality of revolutions of wire and spacers may be located between the revolutions to facilitate cooling the wire. The electromagnet may be connected to a power source that supplies an electric current, such as an AC and/or DC current, to energize the electromagnet. In order to cool the electromagnet, at least during the portion of the time that the electromagnet is energized, air may flow through the electromagnet.

To align the clamp with the electromagnet, the clamp may be capable of being slidably mounted to the structure, such that the clamp may slide to a position opposite and aligned with the electromagnet. In addition, grooves may extend through the clamp in the direction in which the clamp is capable of sliding, such that the clamp may slide over the structure surface without obstruction from previously installed fasteners or other protrusions from the structure. The clamp may include a layer of non-abrasive material on the side of the clamp that faces the structure for ease of sliding the clamp and to prevent the clamp from harming the structure while sliding. Furthermore, the electromagnet and/or the clamp may have an alignment indicator to indicate when the openings of the clamp and the electromagnet are aligned.

Drilling a hole in the structure may include drilling a hole having a countersunk portion. To drill a hole with a countersunk portion, the drilling tool may have a first and second portion, where the first portion has a diameter that is smaller than the diameter of the second portion and the second portion has a length that is greater than the length of the opening of the electromagnet.

The apparatus and method of the present invention may include a template positioned on the structure in the location to be drilled, such that the opening of the electromagnet is aligned with an opening of the template. The electromagnet may also include a first guidepiece that is aligned with and at least partially defines the opening of the electromagnet. The opening of the first guidepiece may be smaller than the opening of the electromagnet. In addition, the electromagnet may include a second guidepiece opposite the first guidepiece, that also is aligned with and partially defines the opening of the electromagnet. As such, if the electromagnet has a first guidepiece, the first guidepiece may be positioned within the opening of the template to align the opening of the electromagnet with the opening of the template.

Further embodiments of the apparatus and method of the present invention may include a platform that is capable of being positioned near the electromagnet. This platform is referred to as a tooling platform herein. A rail mounted to the structure may carry the tooling platform via a transport system, to facilitate gross positioning of the tooling platform, and, thus, the electromagnet relative to the structure. The tooling platform may have a first opening that is aligned with the opening in the electromagnet. In addition, the tooling platform may include a guidepiece that is aligned with and at least partially defines the first opening of the tooling platform. The portion of the first opening with which the guidepiece is aligned, therefore, may be smaller than other portions of the first opening of the tooling platform.

Debris may be removed from the hole as the hole is drilled by creating air flow through the opening defined by the electromagnet in a direction away from the structure. To remove the debris, the tooling platform may include a passageway having one end near the first opening of the tooling platform such that debris is pulled through the passageway while drilling a hole in the structure.

Advantageous embodiments of the apparatus and method of the present invention also provide for the insertion of a fastener in a newly drilled hole. In this regard, air is flowed through the opening of the electromagnet. A fastener is placed into the flow of the air and the fastener is carried along in the air flow and is inserted into the hole. Air may be flowed through the opening of the electromagnet by aligning a tube with the opening in the electromagnet and pulling air through the tube, such as by means of an air flow generator or compressed air. The air flow, such as the air flowed through the opening in the electromagnet, may be laminar air flow. Thus, when the fastener is inserted into the tube, it may be pulled through the tube and then pushed through the opening of the electromagnet and into the hole drilled in the multiple-layer structure. Furthermore, in embodiments that include a tooling platform, the tube may be swivelably attached to the platform so as to alternately be aligned with and displaced from the first opening in the tooling platform.

The apparatus and method of the present invention also include a fastener insertion device and a method of inserting a fastener in a hole defined by a work piece that includes a supply of fasteners, a tube with an opening that is larger than the fastener, and an air flow generator, such as a vacuum source or an air pump, to create air flow in through the tube and out toward the work piece. As such, when the tube is aligned with the hole defined in the work piece and the fastener is placed in the tube, the air carries the fastener through the tube, then inserts it into the hole in the work piece. In some embodiments the fastener may be carried through the tube, through the air flow generator, then into the hole in the work piece. Aligning the tube opening with the work piece hole may include aligning the tube opening with an opening in a template that is aligned with the work piece hole. The tube may have openings about the circumferential surface of the tube to prevent the fastener from inhibiting the air flow when it is placed in the tube. In addition, the air flow may be laminar. As such, fasteners may be efficiently inserted in the holes that have been drilled in the multi-layer structure.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The method and apparatus for drilling holes and optionally inserting fasteners of the present invention provide for efficiently drilling holes through a multiple-layer structure because the layers are securely held together during the drilling by an electromagnet and a clamp, each on opposite sides of the structure. The electromagnet and clamp hold the layers together so tightly that the layers do not have to be disassembled after drilling in order to de-burr the holes and remove the debris from between the layers and, as such, sealant may be applied prior to drilling and the sealant does not have to dry prior to drilling. In addition, the apparatus and method of the present invention may provide for initially drilling the hole with a countersink and for inserting a fastener into the drilled hole, through the electromagnet, immediately after drilling the hole, such that the hole does not have to be revisited after reassembly of the layers and drying of the sealant in order to drill a countersink and/or insert a fastener in a separate operation as is performed in conventional manual installations.

Multiple layers of materials must be fastened together in many applications. For example, portions of buildings, bridges, automobiles, furniture, aircraft, and spacecraft may contain multiple layers or overlapping layers of material that must be securely fastened together. In the aerospace industry, for instance, the fuselage segments of an aircraft are typically joined together by overlapping the segments or by butting the segments together and covering the joint with strips of material and a longeron. In addition, a sealant typically must be applied to the layers prior to fastening the layers together. In the aerospace industry, for example, a sealant is applied between the layers in order to prevent moisture, which may cause corrosion leading to degradation, eventually resulting in stress cracks and/or fatigue failure, from collecting between the layers. Only a very thin layer of sealant should be applied, however, in order to ensure the layers are as close together as possible. Typically, once the sealant is applied, force is exerted upon the layers in order to squeeze out any excess sealant, as described more fully hereinbelow.

Figure 1:
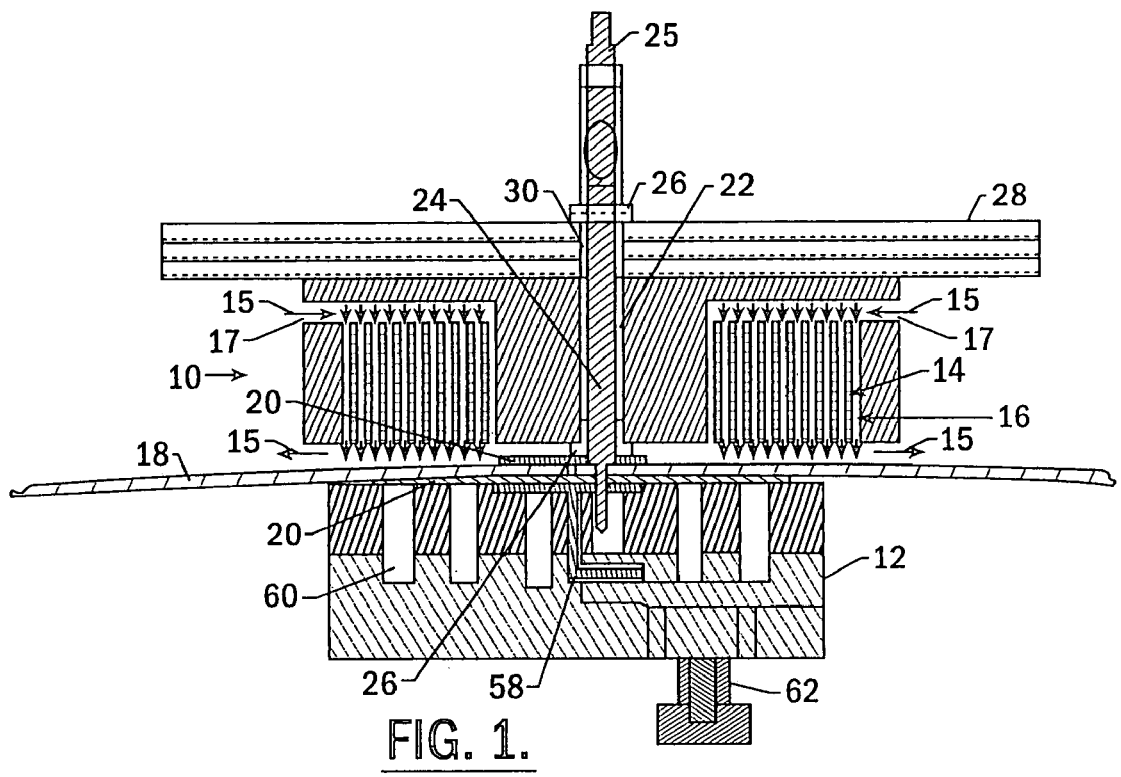
FIG. 1 is a cross-sectional view of an apparatus for drilling holes and optionally inserting fasteners, according to one embodiment of the present invention.
Figure 2:
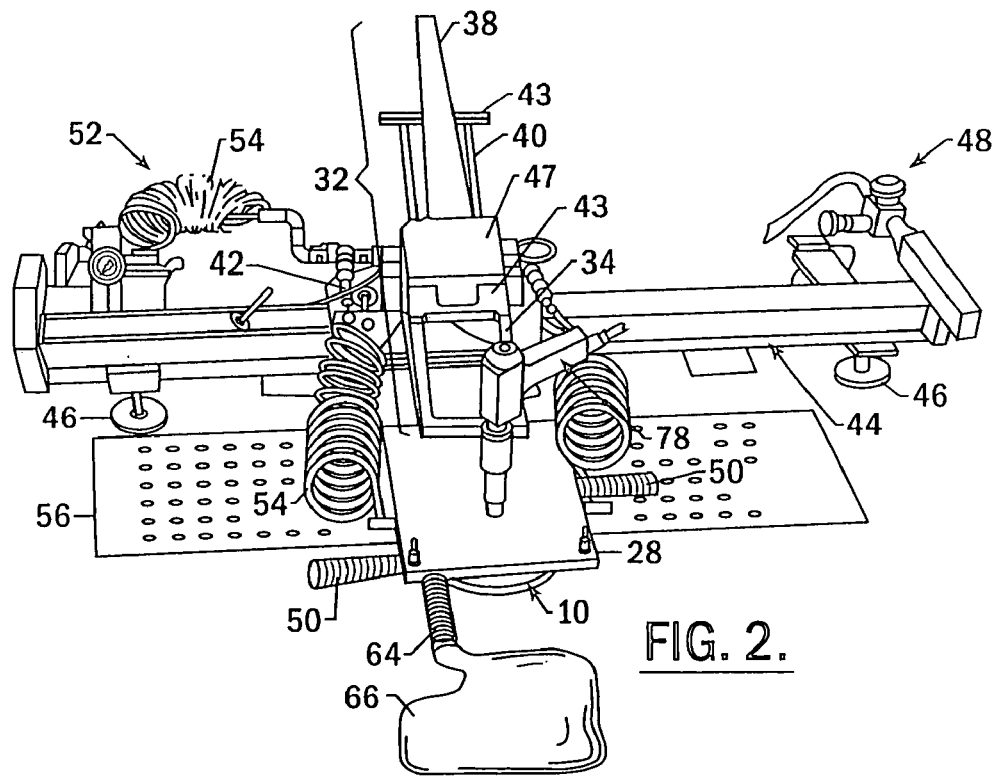
FIG. 2 is a perspective view of an alternative embodiment of an apparatus for drilling holes and optionally inserting fasteners according to the present invention.
Figure 4:
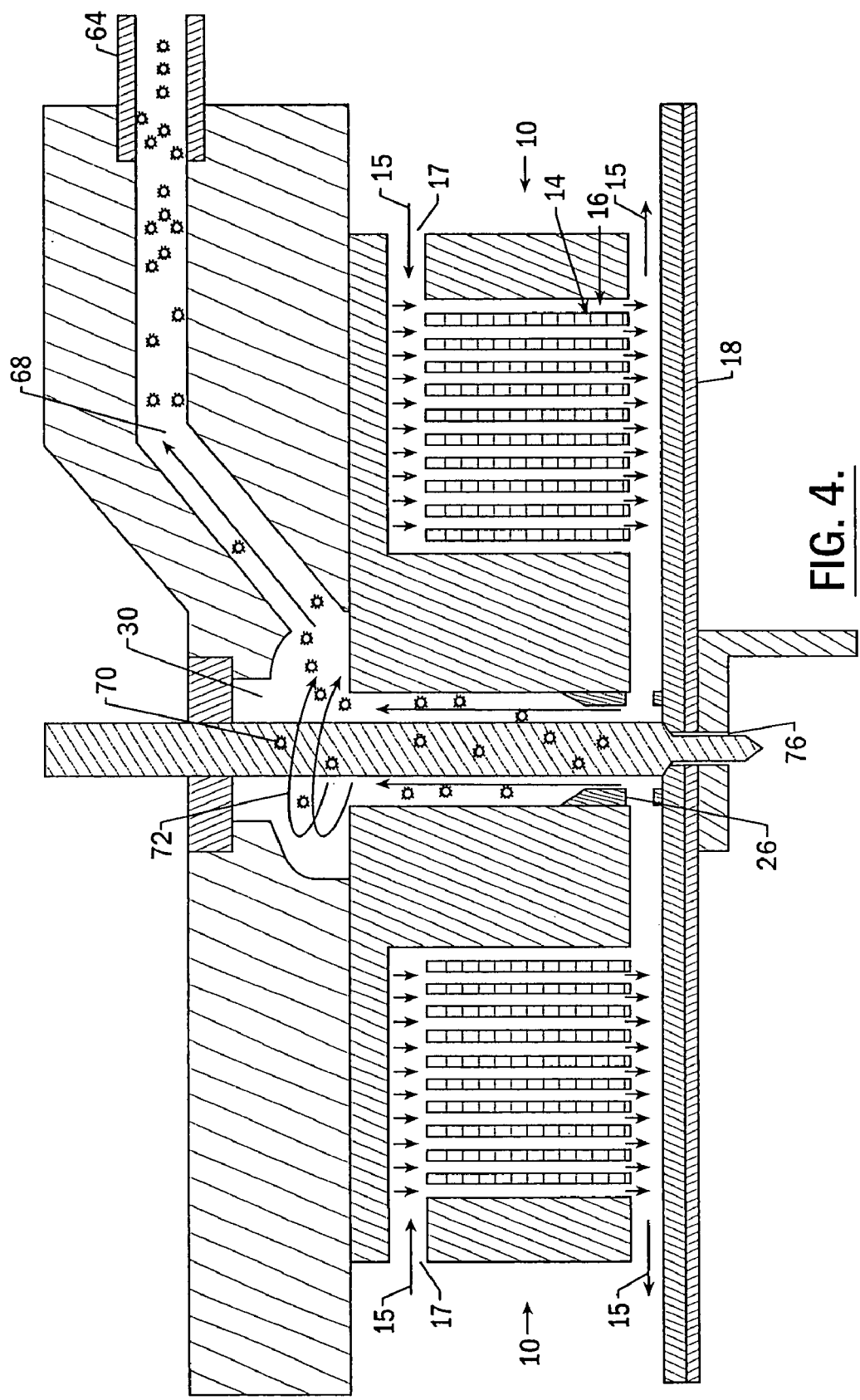
FIG. 4 is cross-sectional view of a further embodiment of an apparatus for drilling holes and optionally inserting fasteners that includes a debris removal system, according to one embodiment of the present invention.

FIGS. 1 and 4 illustrate an electromagnet 10 and clamp 12 assembly holding layers of a structure 18 together. FIG. 1 shows the electromagnet 10 and clamp 12 holding together a butt-joint of a structure 18 that is covered with strips of material 20 and a longeron 58, according to one embodiment of the present invention. The electromagnet 10 may be formed of a plurality of revolutions of wires 14 wrapped about a core of steel. The electromagnet 10 may be connected to a power source that supplies an electric current, such as an AC and/or DC current, to energized the electromagnet. As such, when energized by the current, the electromagnet attracts any magnetic material, such as ferromagnetic material. In addition, when the electromagnet 10 is energized, the temperature of the wires 14 increases, and the electromagnet 10 may require cooling, at least during times of electromagnet operation. The cooling may occur by generating an air flow 15 around the wires 14 of the electromagnet 10. Thus, an air flow generator, such as compressed air, may be connected in fluid communication with the electromagnet 10 in any manner known to those skilled in the art. FIGS. 1 and 4 illustrate the air flow 15 entering the electromagnet 10 at one or more apertures 17, but the air flow 15 may begin at any other appropriate location. FIG. 2 illustrates one embodiment of an air flow path 52 around the wires 14 of the electromagnet by routing the air into and through the electromagnet via tubes 54. Thus, the tubes 54 may connect to the electromagent 10 at aperture 17 or any other appropriate location. In addition, to facilitate cooling, spacers 16 may be placed between the revolutions of wires 14. The spacers 16 may be made of any type of material with a high melting temperature that is also, preferably, non-abrasive and non-conductive, such as Teflon™, commercially available from du Pont de Nemours and Company Corporation, fiberglass, or a weave material. Although the wires may have various shapes, the wires 14 may have a square-circumferential shape that readily stacks within the spacers 16. Another manner in which the cooling may occur is by pumping fluid through a housing of the electromagnet 10 that encloses the wires 14 and/or around the wires 14. The pumping system may cool the fluid and when the fluid flows through the electromagnet 10, it cools the electromagnet 10.

The electromagnet 10 defines an opening 22 typically extending through the center of the electromagnet, through which a drilling tool 24 may extend. Thus, the opening 22 of the electromagnet 10 is aligned with the location on the structure 18 to be drilled. The electromagnet 10 may also have at least one guidepiece 26 aligned with and at least partially defining the opening 22. Embodiments of the electromagnet 10 may include a guidepiece 26 at each end of the opening 22, as shown in FIG. 1, or at only one end of the opening 22. The guidepiece(s) 26 may extend beyond the opening, be flush with the surface of the electromagnet 10, or any other position within the opening 22 of the electromagnet 10. The portion of the opening 22 that is defined by the guidepiece 26 may have a smaller diameter than the other portions of the opening 22. The guidepiece 26 may be a bushing that guides the drilling tool 24 through the opening 22 and prevents side-to-side movement of the drilling tool 24 while extended through the opening 22. Thus, the guidepiece 26 may be made of a material that is harder than the material of the drilling tool 24 in order to withstand contact with the drilling tool 24. For example the guidepiece 26 may be made of a hardened steel, such as D2 metal. Additionally, if the electromagnet has a guidepiece facing the structure, that guidepiece can contact the surface of the structure to be drilled so as to transfer the force of the electromagnet to a minimized and specific area surrounding the location of the hole to be drilled.

In some embodiments of the drilling apparatus, a platform 28, hereinafter referred to as a tooling platform 28 may be attached to the electromagnet 10 on the side of the electromagnet 10 that is opposite the structure 18. The tooling platform 28 defines an opening 30 that is aligned with the electromagnet opening 22. In this embodiment, the guidepiece 26, as described above, may be aligned with and at least partially define the opening 30. For example, the guidepiece 26 may extend inwardly from the tooling platform 28 towards the electromagnet 10 for insertion within the opening 30 defined by the electromagnet 10. The tooling platform 28 and, in turn, the electromagnet 10 are capable of being controllably moved with respect to the work piece as described below.

In further embodiments of the present invention, a drilling template 56 may be attached to the structure 18 over the location(s) to be drilled in order to guide the operator in drilling holes in the correct location(s) of the structure 18. The drilling template 56 may be attached to the structure 18 in any manner known to those skilled in the art. One example of attaching the drilling template 56 to the structure 18 is by first taping and/or strapping the template to the outside of the structure, then loosely aligning all parts involved in the join, such as the strips of material 20 and the longeron 58, using C-clamps and/or tape. A few holes are drilled through the structure 18, the strips 20, and the longeron 58 (i.e., the parts) using the drilling template 56 and KWIK-LOK™ clamps temporarily affix the template to all of the parts.

Thus, the operator may position the electromagnet 10, via the transport system 32, if applicable, as described below, such that the electromagnet opening 22 is aligned with an opening in the drilling template 56 and, in turn, with the desired drilling location on the work piece. In those embodiments in which the electromagnet 10 includes a guide piece 26 extending outwardly therefrom toward the template, the guide piece 26 may be sized to fit within the desired opening in the drilling template 56 to facilitate aligning the electromagnet opening 22 with the location to be drilled.

As shown in FIG. 2, the tooling platform 28 may be attached to the transport system 32. The transport system 32 facilitates movement and alignment of the platform 28 and, in turn, the electromagnet 10, in relation to the structure 18. The movement may be controlled by the operator via at least one handle 50 attached to the tooling platform 28 and/or the electromagnet 10. The transport system 32 may move in relation to the structure 18 by mounting the transport system 32 on a rail 44. The rail 44 is generally aligned to be substantially parallel to the location(s) of the holes(s) to be drilled in the structure 18. If the embodiment includes a drilling template 56, as described above, the rail 44 may be positioned to be substantially parallel to the top edge of the drilling template 56 that indicate the location(s) of the hole(s) to be drilled in the structure 18. The rail 44 may be mounted to the structure 18 by any means known to those skilled in the art. FIG. 2 illustrates one embodiment in which the rail is mounted on the structure with suction cups 46. The air within the suction cups 46 may be controlled by valve 48, such that once the rail 44 is aligned substantially parallel to the location(s) of the hole(s) to be drilled on the structure, air may be removed from the suction cups 46 to secure the rail 44 to the structure 18 by adjusting the valve 48 accordingly. In addition, to remove the secured rail 44 from the structure 18, air may be added to the suction cups 46 to loosen the suction cups 46 and, therefore, the rail 44, from the structure by adjusting the valve 48 accordingly. The transport system 32 is mounted on the rail 44 via rail transport member 42, which is shaped to slidably engage with a portion of the rail 44.

Figure 3:
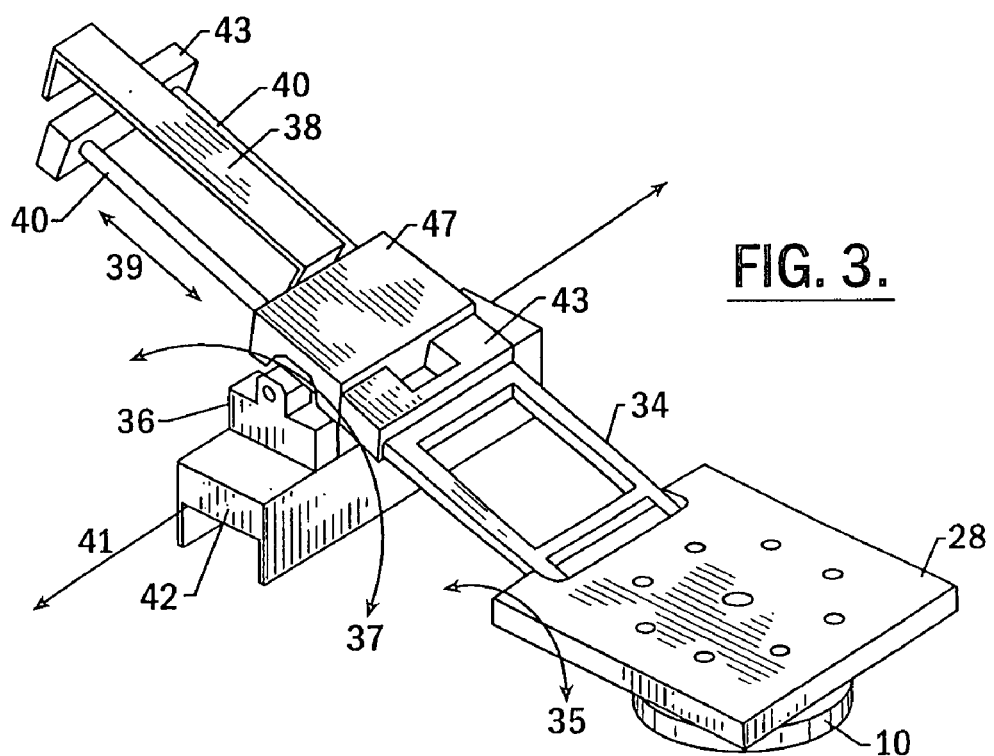
FIG. 3 is a perspective view of a transport system connected to a platform and, in turn, an electromagnet, according to one embodiment of the present invention.

FIG. 3 depicts a more detailed view of the transport system 32 and the movements it facilitates. Rail transport member 42 may slide along the rail 44 in the directions indicated by arrow 41 in order to move the electromagnet 10 to an appropriate location on the structure 18 in the directions indicated by arrow 41. Arm member 34 may also be connected to the rail transport member 42 at pivot point 36, permitting movement of the arm member 34 in relation to the rail transport member 42 in the rotational direction designated by arrow 37. Because arm member 34 connects the tooling platform 28 to the rest of the transport system 32, movement between arm member 34 and rail transport member 42 in the direction of arrow 37 facilitates movement of the tooling platform 28 and, in turn, the electromagnet 10 away from and toward the structure 18. Arm member 34 is also hingedly mounted to the tooling platform 28, permitting movement of the tooling platform 28 in relation to the arm member 34 in the rotational direction designated by arrow 35. Thus, movement between arm member 34 and tooling platform 28 in the direction of arrow 35 facilitate positioning the tooling platform 28 and, in turn, the electromagnet 10, such that the openings 30 and 22 are normal to the surface 18. If the surface 18 is curved, then the tooling platform 28 and, in turn, the electromagnet 10 may be positioned perpendicular to a line tangent to the curvature of surface 18 at the location at which a hole is to drilled. In addition, the hinged connections between arm member 34 and tooling platform 28, and between arm member 34 and rail transport member 42 may cooperate to further facilitate the movements described above.

To normalize openings 30 and/or 22 to the structure 18, particularly along a curved surface of the structure 18, the tooling platform 28 and/or electromagnet 10 may include other features to define the distance between at least a portion of the tooling platform 28 and/or electromagnet 10 and the structure 18. For example, an adjustment mechanism may serve to define the distance between the tooling platform 28 and, therefore, the electromagnet 10, only over the portion of the structure that curves away from the location of the hole to be drilled, such that the openings 30 and 22 are positioned normal to the drilling location.

Arm member 34 is also capable of moving relative the rail transport member 42 in the directions indicated by arrow 39. Thus, movement between arm member 34 and shafts 40 in the directions of arrow 39 facilitate positioning the platform and, in turn, the electromagnet 10, over the location on the structure 18 to be drilled. Arm member 34 may be attached to shafts 40, and shafts 40 may slidably move through openings in housing 47. Housing 47 may contain bushings about the openings to facilitate sliding of the shafts 40. Caps 43 located at the top and bottom of shafts 40 serve to prevent arm member 34 from moving more than a predetermined distance with respect to rail transport member 42, and, therefore further controls the movement of tooling platform 28 and, in turn, electromagnet 10, in relation to the structure 18. In addition, a tension spring may be connected between the top cap of shafts 40 and spring bracket 38 to facilitate ergonomic movement of the tooling platform 28 and, in turn, the electromagnet 10 by creating a counterbalance force to resist gravity and thereby reduce the force needed to position the tooling platform 28 and, in turn, the electromagnet 10, with respect to the structure 18. Furthermore, the transport system 32 may include a any type of mechanism known to those skilled in the art that allows for a quick connection and disconnection between the tooling platform 28, the electromagnet 10, and the transport system 32.

Prior to, while, or after positioning the electromagnet opening 22 in alignment with the location on the structure 18 to be drilled, the clamp 12 may be placed on the opposite side of the structure 18. The clamp 12 may be at least partially made of a magnetic material, such as a ferrous material, so that when the electromagnet 10 is energized, the electromagnet 10 and the clamp 12 are attracted together. The clamp 12 and electromagnet 10 are placed on opposite sides of the multiple layer structure 18, such that when the electromagnet 10 is energized and attracts the clamp 12, the layers are tightly held together.

As FIG. 1 illustrates, the clamp 12 may be shaped to slidably attach to the structure 18. The clamp 12, therefore, may be shaped to receive a portion of the structure 18 and to be capable of sliding over any protrusions in the structure. For example, in the aerospace industry, the clamp 12 may be shaped to receive a longeron 58 and to be capable of sliding along the longeron 58. In addition, the clamp 12 may have recesses 60 through which any existing fasteners in the structure may pass, thereby permitting the clamp 12 to freely slide. As such, the surface of the clamp 12 that contacts the structure 18 and longeron 58 may be coated with a layer of non-abrasive material, such as Teflon™, commercially available from du Pont de Nemours and Company Corporation, to avoid harming the structure 18 or longeron 58. Alternatively, multiple clamps 12 may be placed along the portion of the structure 18 to be drilled, so that the clamps 12 do not need to be slid as often, as far or at all. In another embodiment, the clamp 12 may be shaped to cover the length of the area of the structure 18 to be drilled, such that the clamp 12 does not have to be slid.

For embodiments of the clamp 12 that must be positioned relative to the electromagnet, i.e. when the clamp 12 or multiple clamps 12 do not cover the entire area of the structure to be drilled, the clamp 12 and electromagnet 10 must be aligned. To align the clamp 12 and the electromagnet 10, either the clamp 12, the electromagnet 10 or both may have an alignment indicator. The alignment indicator presents some type of signal when the clamp 12 and the electromagnet 10 are properly placed on opposite sides of the work piece relative to each other. For example, a permanent magnet may be placed on the clamp 12 and/or the electromagnet 10 and the alignment indicator located on the other one of the electromagnet 10 and/or the clamp 12 with the alignment indicator being embodied by a magnetic sensor capable of providing a signal, such as a mechanical movement of a needle or the like, or the illumination of a light, upon detecting the presence of the magnet.

Once the clamp 12 is in place, it may be secured to the structure 18, such as the longeron 58, by any manner known to those skilled in the art. For instance, the clamp 12 may have two segments that cooperate to define a recess that is shaped to receive the portion of the structure upon which the clamp 12 rides. The clamp 12 may also include a threaded connector having a knob 62 that is accessible and may be rotated to move the two portions of the clamp 12 closer together and to secure the clamp 12 on the desired portion of the structure. In another example, the two segments of the clamp 12 may be hingedly connected, such that when the two segments are rotated into alignment with each other about the desired portion of the structure, the segments may be locked into place by any manner known to those skilled in the art, such as a spring lock, in order to be secured to the structure.

When both the electromagnet 10 and the clamp 12 are properly positioned, the electromagnet may be energized in order to force the layers of the structure 18 and longeron 58, if appropriate, together. The amount of force exerted upon the layers of the structure 18 and longeron 58, if appropriate, should be sufficient to prevent the layers from moving apart as a drilling tool 24 impinges each layer and should be sufficient to ensure that the sealed layers are as close together as possible. Thus, the electromagnet 10 and clamp 12 assembly allows operators to apply the sealant before drilling the hole in the structure and without having to wait for the sealant to dry because the energized electromagnet 10 and clamp 12 hold the layers together tight enough to squeeze out extra sealant prior to drilling, prevent exit burrs from forming in the drilled hole, and prevent debris from accumulating between the layers during drilling. Therefore, the electromagnet 10 and clamp 12 assembly reduces the time and expense involved in drilling holes in multiple layer structures, in which the layers otherwise would have to be disassembled and cleaned after drilling, then reassembled with a fast-drying sealant, the excess of which must be squeezed out and the remaining sealant dried prior to fastening the layers.

The electromagnet 10 may be energized by any manner known to those skilled in the art. Examples include placing an electromagnet power switch where the operator can easily reach the switch, such as on a handle 50 or the tooling platform 28, to activate a flow of electric current to the electromagnet 10 from a power source. When the electromagnet 10 is energized, the electromagnet cooling air flow may also be activated, as described above. In addition, in some embodiments, a debris removal system may be activated when the electromagnet 10 is energized. Alternatively, the cooling air flow and/or debris removal system may have separate activation switches. As a further alternative, the debris removal system may only be activated when the drill motor 78 is activated by monitoring the drill power line.

The debris removal system may include a air flow source 64 and a collection container 66, as shown in FIG. 2. FIG. 4 illustrates a detailed view of the operation of the debris removal. The air flow source 64 may be any type of relatively small diameter and high velocity vacuum source, such as a Magnavon pneumatically actuated FOD vacuum bag, commercially available from Magnavon Industries Inc, Placentia, Calif. The air flow source 64 may be attached to a passageway 68 defined or carried by the tooling platform 28 that extends outwardly from the platform opening 30. Alternatively, the air flow source 64 may be attached in any manner such that the air flow source 64 may pull debris 70 out of the hole being drilled in the structure 18. For example the air flow source 64 may be attached to an opening between the structure 18 and the electromagnet 10, an alternate opening in the electromagnet, or an opening between the tooling platform 28 and the electromagnet 10. The air flow source 64 generates air flow 72 from the structure 18 to the collection container 66. To do this, the air flow source 64 may pull air from between the electromagnet 10 and the structure 18 through openings in the guidepiece 26 that partially defines the opening 22 closest to the structure 18, as designated by the arrows 74. Thus, as the drilling tool 24 drills through the layers of material of the structure 18, the debris 70 created by the drilling is pulled through the flutes of the drilling tool and from the hole 76 to the debris collection container 66. Furthermore, the motion of removing the drilling tool 24 from the hole 76 and the openings 22 and 30 facilitates the debris removal. Removing the debris 70 in this way therefore reduces the risk that the debris 70 will accumulate in the hole 76 near or between the layers of the structure 18.

As FIG. 2 illustrates, the drilling tool 24, such as a drill bit, may be mounted to a countersink cage 25, referred to hereinafter as a microstop countersink cage 25, and then mounted to a manual hand drill motor 78. The drilling tool may be inserted through the openings 30 and/or 22 once the electromagnet 10 has been energized and the debris removal system activated, if desired. Alternatively, any type of drill motor 78 having a drill tool 24 may be used, such as any other manual or automatic drills known to those skilled in the art. FIGS. 1 and 4 illustrate one embodiment of the drilling tool 24 to create a countersunk hole 76, although other types of drilling tools may be utilized. The drilling tool 24 has a length sufficient to extend through the tooling platform 28, if applicable, and the electromagnet 10. In addition, the length is sufficient for the drilling tool 24 to extend the desired amount into the structure 18 to create the desired hole. Thus, the drill tool 24 may have a shape such that a countersunk hole 76 is created or a cylindrical hole is created.

If a countersunk hole 76 is desired, the drilling tool 24 has a tip portion with a smaller diameter than the rearward portion of the tool. Thus, in order to ensure that the drill operator does not insert the larger diameter portion of the drilling tool 24 into the structure too far, a microstop countersink cage 25 is advantageously positioned between the drill motor 78 and the drilling tool 24. The microstop countersink cage 24 is calibrated to be positioned over the openings 30 and/or 22 such that the microstop countersink cage 25 contacts the tooling platform 28, guidepiece 26, or the electromagnet 10, depending upon the configuration, and prevents insertion of the drilling tool 24 any further into the structure 18. The depth defined by contact of the microstop countersink cage 25 generally permits the larger diameter rearward position to form a countersink proximate to one surface of the structure and the smaller diameter tip portion to form a hole within, typically completely through the structure. Thus, the apparatus and method of the present invention permit a properly sized countersunk hole 76 to be drilled in a structure in one operation, instead of having to revisit the hole after reassembling the layers and allowing the sealant to dry to drill the countersunk portion of the hole, as is the case in the conventional process.

Figure 5:
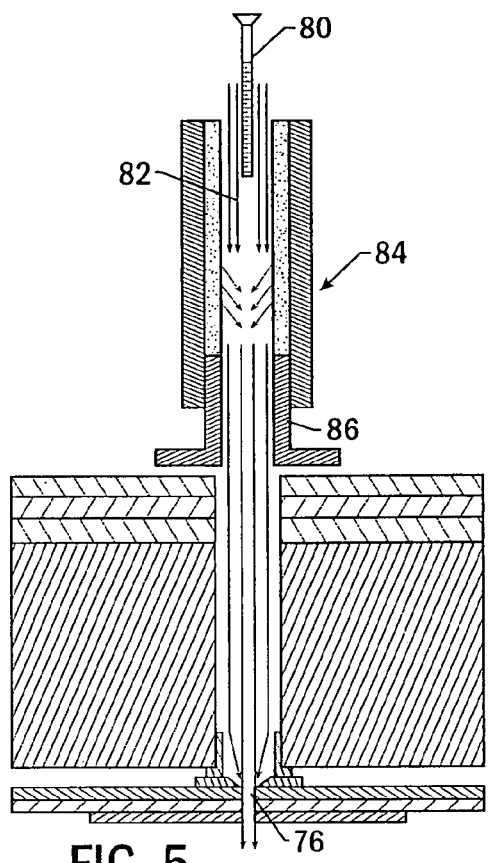
FIG. 5 is a cross-sectional view of a fastener insertion system according to one embodiment of the present invention.

Once the properly sized hole 76 is drilled in the structure 18 and longeron 58, if applicable, the drilling tool 24 may be removed and the debris removal system deactivated. A fastener 80 may then be inserted into the hole. While the fastener 80 may be inserted by hand after deactivating and moving the electromagnet 10, the fastener 80 also may be inserted without moving the electromagnet 10 by a fastener insertion system directly through the opening 22 of the electromagnet 10. The fastener insertion system generates air flow to carry the fastener 80 toward and into the hole 76. As shown in FIG. 5, air flow 82 may be generated by an air flow generator 84. The air flow generator 84 may be any type of air flow generator including a vacuum source or an air pump or fan, that generates air of a sufficient velocity to carry the fastener 80. In addition, the air flow generator may be located anywhere relative to the hole 76 in order to create the desired air flow. In the shown embodiment, the air flow 82 is generated such that it flows through the opening 30 and/or 22 and/or hole 76. Thus, if the air flow generator 84 is a vacuum source, the vacuum source may be adapted to create an air flow 82 as described above. Preferably, the generated air flow is laminar. One example of the air flow generator 84 is the DF3-6 vacuum generator, commercially available from Vaccon Corp., which provides up to 393 feet/second maximum air velocity. The fastener insertion system may also include a seating 86 to contact the electromagnet opening 22, or the platform opening 30, or the guide piece 26 in embodiments in which the electromagnet 10 or the platform 28, respectively, still overlie the structure while the fastener 80 is installed. The seating 86 is a seal that reduces the amount of air that escapes between the air flow generator 84 and the hole 76, and ensures the fastener 80 is carried to the hole 76 with the maximum amount of air velocity.

Figure 6A:
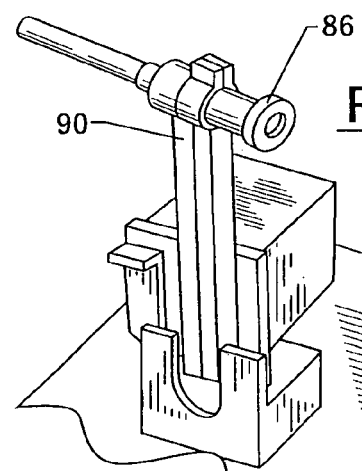
FIG. 6A is a perspective view of an alternative embodiment of a fastener insertion system swivelably attached to a platform and in a first position, according to the present invention.
Figure 6B:
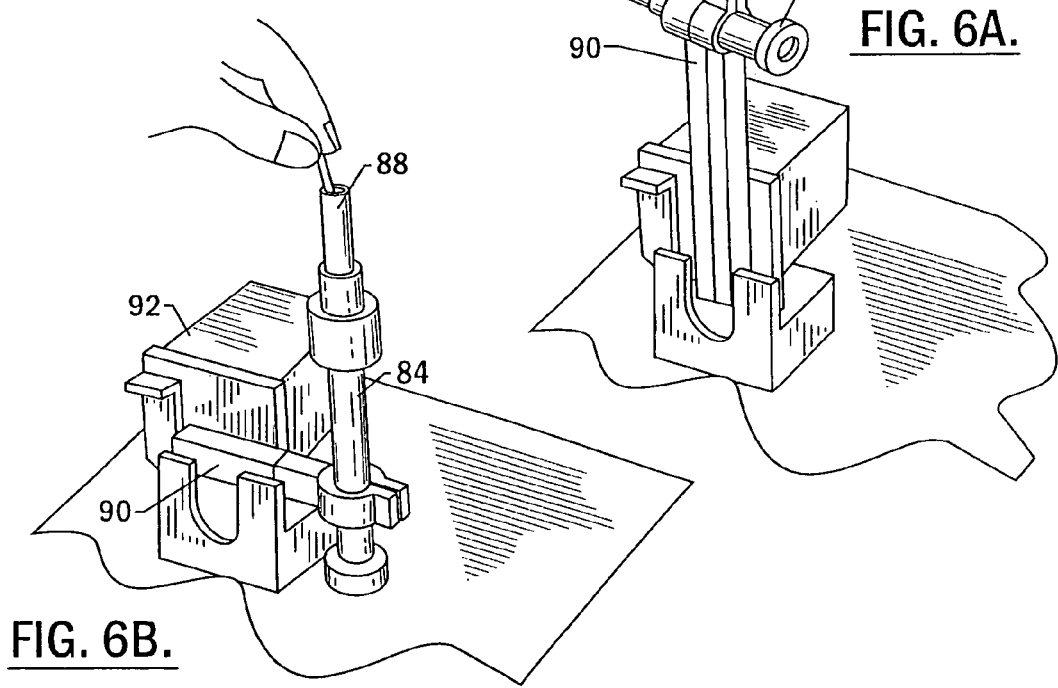
FIG. 6B is a perspective view of the embodiment of the fastener insertion system depicted in FIG. 6A in a second position, according to the present invention.

The fastener insertion system may be aligned with and placed directly over the hole 76 or it may be aligned with and placed over the tooling platform opening 30, the electromagnet opening 22, or over the guidepiece 26 in embodiments in which the platform 28 or electromagnet 10, respectively, still overlie the structures while the fastener 80 is installed. In embodiments that include a tooling platform 28, the fastener insertion system may be swivelably attached to the tooling platform 28, as illustrated in FIGS. 6A and 6B. In the embodiment shown in FIGS. 6A and 6B, the fastener insertion system includes the air flow generator 84, the seating 86, and a tube 88 to facilitate insertion of the fastener 80 into the hole. The tube 88 may have circumferential openings that prevent the fastener 80 from inhibiting the air flow to the air flow generator 84. Moreover, the tube 88 must be slightly larger in diameter than the fastener 80 to permit the fastener to pass therethrough.

The fastener insertion system may be attached to moveable arm 90, such that the arm 90 may move the fastener insertion system from the position shown in FIG. 6A to the position shown in FIG. 6B. Thus, the fastener installation system may be in the position shown in FIG. 6A during drilling operations, and in the position shown in FIG. 6B during fastener installation operations. The length of the arm 90 is such that the fastener insertion system may be aligned with the platform opening 30 once in the position shown in FIG. 6B. The arm 90 may be connected to the platform 28 via a hinge and movement may be activated by a motor 92. Any type of motor known to those skilled in the art that provides sufficient power to move the arm 90 attached to the fastener insertion system in and out of position over the platform opening 30 may be used. One example of the motor 92 is a 24 VDC subfractional Hp gear motor. The motor 92 may be activated by a switch, preferably located such that an operator may easily reach it. In some embodiments, the switch also may control power to the air flow generator 84, such that when the fastener insertion system is activated, the air flow generator 84 is actuated. Once the motor 92 moves the arm 90 and fastener insertion system into position over the platform opening 30, the backdrive of the motor is compensated by switching to an alternate circuit that places a resistor in series to limit the current applied by the motor to the fastener insertion system and, therefore, hold the fastener insertion system in place. The air flow generator 84 then may be activated and a fastener 80 may be inserted into the tube 88. The air flow 82 carries the fastener 80 toward and into the hole 76. After the fastener is inserted in the hole 76, a toggle switch for the motor 92 may be activated to move the arm 90 and the fastener insertion system away from the hole 76, to the position shown in FIG. 6A.

If the size of the hole 76 is drilled to be a clearance fit with the fastener 80, i.e. the diameter of the hole 76 is larger than the diameter of the fastener 80, then, after insertion, the fastener 80 may be secured to the structure 18 in any manner known to those skilled in the art such as by tightening a nut about a threaded portion of the fastener extending through the structure or by securing a collar on the portion of the fastener that extends through the structure. If the size of the hole 76 is drilled to be an interference fit with the fastener 80, i.e., the diameter of the hole 76 is smaller than the diameter of the fastener 80, then the fastener will not be completely inserted into the hole 76 after insertion. In this case, a fastener seating device having a bar of sufficient length to extend through the platform opening 30, if applicable, and the electromagnet opening 22 may be used to apply force to the fastener 80 in order to completely insert the fastener 80 into the hole 76. The fastener seating device may be any type of seating device known to those skilled in the art, such as a rivet gun. The fastener 80 is then ready to be secured to the structure 18 in any manner known to those skilled in the art.

Thus, the apparatus and method of the present invention drills holes and optionally inserts fasteners in a manner that reduces the amount of time, labor and cost involved in drilling holes in multiple-layer structures and fastening the layers together. By utilizing an electromagnet 10 and a clamp 12, the layers are held tightly together to ensure that the layers will not separate as the tip of the drilling tool 24 impinges each layer and, as such, debris does not accumulate between the layers and exit burrs will not form. Thus, the layers do not have to be cleaned, de-burred and reassembled before sealant can be applied, a countersink drilled, or a fastener inserted because the electromagnet 10 and clamp 12 assembly permit the layers to be sealed prior to drilling, a countersunk hole to be drilled in one drilling operation, and a fastener to be immediately inserted into the hole.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of drilling a hole in a multiple-layer structure, comprising:
    positioning an electromagnet proximate the structure such that an opening defined by the electromagnet defines a location of the hole to be drilled in the structure;
    positioning a clamp proximate the structure opposite the electromagnet;
    securing the clamp to the structure;
    energizing the electromagnet to securely hold the multiple layer structure together once the clamp has been positioned and secured;
    positioning a drilling tool within the opening defined by the electromagnet; and
    drilling a hole in the multiple layer structure at the location defined by the opening defined by the electromagnet.

2. The method of claim 1, further comprising positioning a template on the structure in the location to be drilled, wherein positioning the electromagnet comprises positioning the electromagnet on the template such that the opening defined by the electromagnet is aligned with an opening defined by the template.

3. The method of claim 2, wherein the electromagnet comprises a guidepiece aligned with and partially defining the opening, and wherein positioning the electromagnet on the template comprises positioning the guidepiece within the opening defined by the template to align the opening defined by the electromagnet with the opening defined by the template.

4. The method of claim 1, wherein positioning the clamp comprises positioning the clamp such that an opening defined by the clamp is aligned with the opening defined by the electromagnet.

5. The method of claim 1, further comprising:
    flowing air through the opening defined by the electromagnet; and
    inserting a fastener into the hole drilled in the multiple-layer structure by pushing the fastener through the opening defined by the electromagnet and into the hole drilled in the multiple-layer structure with the air.

6. The method of claim 5, wherein flowing air through the opening defined by the electromagnet comprises:
    aligning a tube with the opening defined by the electromagnet; and
    pulling air through the tube.

7. The method of claim 5, wherein inserting the fastener comprises pulling the fastener through the tube and pushing the fastener through the opening defined by the electromagnet, and into the hole drilled in the multiple-layer structure.

8. The method of claim 5, wherein flowing air through the opening defined by the electromagnet comprises maintaining a laminar air flow through the opening defined by the electromagnet.

9. The method of claim 1, wherein the clamp defines an opening, and wherein positioning the clamp comprises receiving an indication from an indicator located on at least one of the electromagnet and the clamp that the openings defined by the electromagnet and the clamp are aligned.

10. The method of claim 1, wherein drilling a hole comprises drilling a hole having a countersunk portion.

11. The method of claim 1, further comprising sealing the multiple layers prior to positioning the electromagnet.

12. The method of claim 1, further comprising cooling the electromagnet with air flowing through the electromagnet at least during a portion of the time that the electromagnet is energized.

13. The method of claim 1, further comprising removing debris from the hole as the hole is drilled by creating air flow through the opening defined by the electromagnet in a direction away from the structure.

14. The method of claim 1, wherein positioning an electromagnet comprises normalizing the opening defined by the electromagnet to the portion of the structure to be drilled.

* * * * *